(12) United States Patent
Matsubara et al.

(10) Patent No.: US 7,746,788 B2
(45) Date of Patent: Jun. 29, 2010

(54) TRAFFIC INFORMATION AGGREGATING APPARATUS

(75) Inventors: Daisuke Matsubara, Tachikawa (JP); Yasushi Fukuda, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 215 days.

(21) Appl. No.: 12/003,195

(22) Filed: Dec. 20, 2007

(65) Prior Publication Data
US 2008/0151757 A1 Jun. 26, 2008

(30) Foreign Application Priority Data
Dec. 26, 2006 (JP) .............................. 2006-348914

(51) Int. Cl.
*G01R 31/08* (2006.01)
*G06F 15/173* (2006.01)
*G06F 15/16* (2006.01)

(52) U.S. Cl. ................... 370/237; 370/252; 709/224; 709/232

(58) Field of Classification Search ................. 370/237, 370/252; 709/225, 229, 232, 203, 224
See application file for complete search history.

(56) References Cited

U.S. PATENT DOCUMENTS

| | | | | |
|---|---|---|---|---|
| 6,546,420 | B1 * | 4/2003 | Lemler et al. ............... | 709/224 |
| 6,807,156 | B1 * | 10/2004 | Veres et al. .................. | 370/252 |
| 7,142,512 | B1 * | 11/2006 | Kobayashi et al. .......... | 370/232 |
| 7,496,661 | B1 * | 2/2009 | Morford et al. ............. | 709/224 |
| 7,508,764 | B2 * | 3/2009 | Back et al. ................... | 370/235 |
| 2002/0099844 | A1 * | 7/2002 | Baumann et al. ............ | 709/232 |
| 2003/0028467 | A1 * | 2/2003 | Sanborn ....................... | 705/36 |
| 2003/0191853 | A1 * | 10/2003 | Ono ............................. | 709/232 |
| 2005/0152375 | A1 * | 7/2005 | An et al. ................. | 370/395.41 |
| 2006/0233115 | A1 * | 10/2006 | Matityahu et al. ........... | 370/252 |
| 2006/0277296 | A1 | 12/2006 | Matsubara et al. | |
| 2007/0201359 | A1 * | 8/2007 | Matsubara et al. .......... | 370/230 |
| 2008/0028467 | A1 * | 1/2008 | Kommareddy et al. ........ | 726/23 |

FOREIGN PATENT DOCUMENTS

JP  2005-072907  8/2003

* cited by examiner

*Primary Examiner*—Steven H Nguyen
*Assistant Examiner*—Candal Elpenord
(74) *Attorney, Agent, or Firm*—Stites & Harbison PLLC; Juan Carlos A. Marquez, Esq.

(57) ABSTRACT

A traffic information aggregating apparatus (hereinafter an aggregating apparatus) receives traffic information from a network apparatus. The aggregating apparatus generates aggregated data in which the traffic information for each previously determined aggregation time is aggregated, and stores the aggregated data into an aggregated data management table correspondingly to an aggregation identifier. The aggregating apparatus determines, at the interval of the aggregation time, whether a difference between the aggregated data and a base value is within a previously determined range, and accumulates, in the case where it is within the range, the aggregated data to corresponding accumulated data of the aggregated data management table, and resets the aggregated data. In the case where it exceeds the range, the aggregating apparatus exports the aggregated data and/or the accumulated data of the aggregated data management table to the monitor server.

12 Claims, 11 Drawing Sheets

| AGGREGATION ID (AGGR_ID) | AGGREGATED DATA VALUE AGGR_VALUE (bandwidth, number of packets, number of flows, etc.) | BASE VALUE (BASE_VALUE) | ACCUMULATED VALUE (ACCU_VALUE) |
|---|---|---|---|
| 1 | 448 | 461 | 1500 |
| 2 | 192 | 188 | 1120 |
| 3 | 215 | 211 | 800 |

TRAFFIC INFORMATION AGGREGATING APPARATUS

CLAIM OF PRIORITY

The present application claims priority from Japanese application JP 2006-348914 filed on Dec. 26, 2006, the content of which is hereby incorporated by reference into this application.

BACKGROUND OF THE INVENTION

1. Field of the Invention

The present invention relates to a traffic information aggregating apparatus, and particularly to a traffic information aggregating apparatus in a traffic monitor system in which traffic information is accumulated and aggregated.

2. Description of the Related Art

Figure 1:
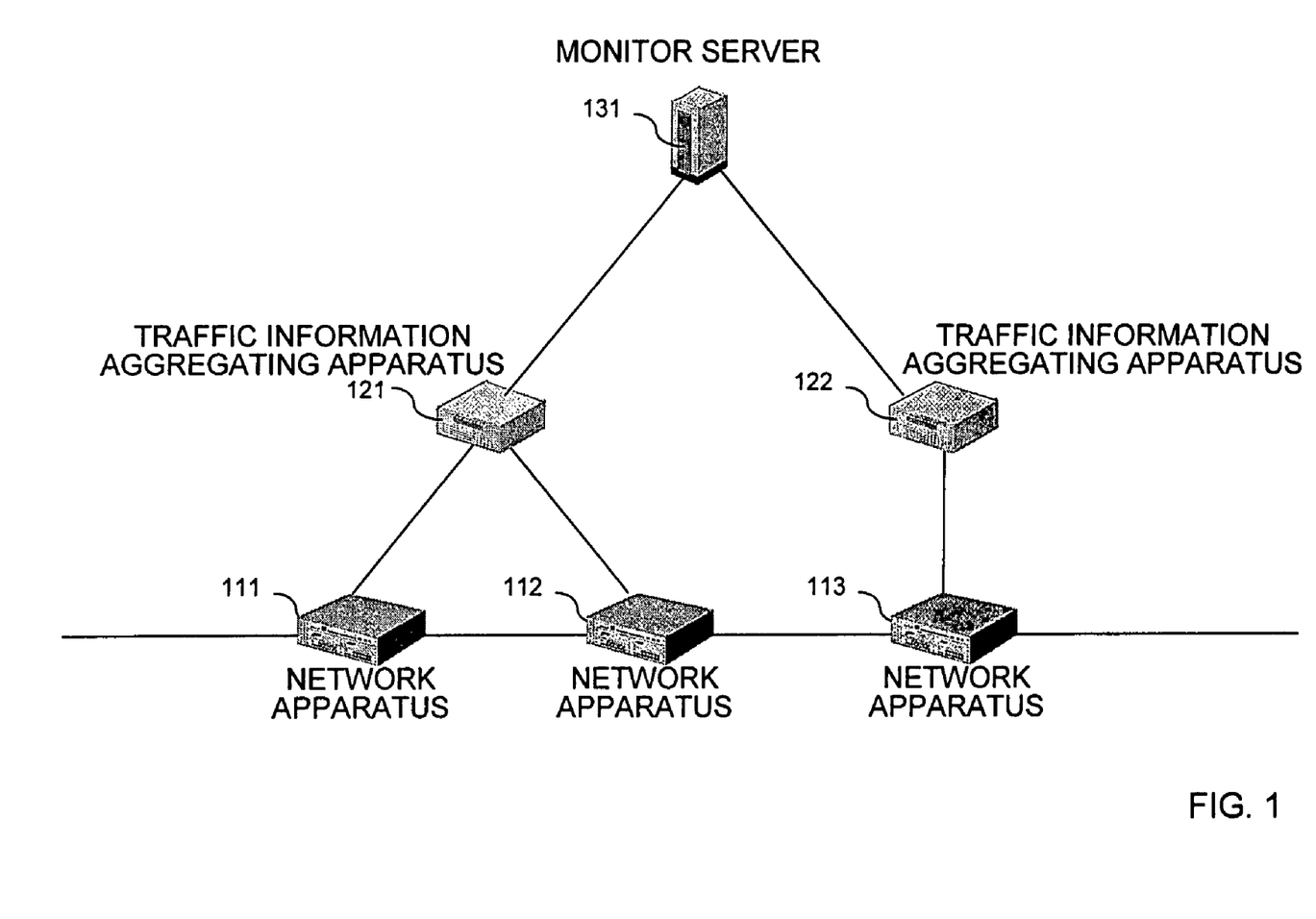
FIG. 1 is a view showing the whole system structure of the invention.

In a traffic monitor system, for example, as shown in FIG. 1, a traffic information aggregating apparatus is connected to a network apparatus, and further, a monitor server is connected. Traffic information such as NetFlow or sFlow is transmitted from the network apparatus to the traffic information aggregating apparatus. The traffic information aggregating apparatus aggregates the received traffic information and transmits it to the monitor server.

Besides, there is disclosed a system in which an intermediate router aggregates information from a terminal router, and transmits the aggregated result to an aggregated information reception apparatus (see, for example, patent document JP-A-2005-72907).

In the case of the related art system, the traffic information aggregating apparatus exports all aggregated data to the monitor server at every specific period. In this case, when the number of monitor flows in the network apparatus is large, the monitor server receives a huge amount of aggregated data, and congestion can occur.

SUMMARY OF THE INVENTION

In view of the above, it is an object of the present invention to provide a traffic information aggregating apparatus which reduces the transmission amount of aggregated data to be exported to a monitor server. Besides, it is another object of the invention to export only aggregated information with a large variation when a traffic information aggregating apparatus exports aggregated data to a monitor server.

According to an aspect of the invention, in a network system including, for example, a network apparatus, a traffic information aggregating apparatus and a monitor server, when an aggregated data value exceeds a threshold value, the traffic information aggregating apparatus exports the relevant aggregated data to the monitor server.

Besides, the traffic information aggregating apparatus in a traffic information aggregating system includes, for example, a communication IF unit, a control processing processor, a memory and a data recording device. The memory includes a base value management process to manage a base value, an aggregated data check process to confirm aggregated data, a traffic information reception process to receive traffic information, an aggregation process to aggregate the traffic information, and an aggregated data management table to manage the aggregated data.

The traffic information table in the traffic information aggregating apparatus manages, for example, an aggregation identifier, an aggregated data value, a base value and an accumulated value.

In an export system in the traffic information aggregating apparatus, for example, accumulated data and aggregated data are exported to the monitor server. Alternatively, in the export system of the traffic information aggregating apparatus, the aggregated data is exported to the monitor server.

In a base value management system of the traffic information aggregating apparatus, for example, when the aggregated data exceeds a threshold value, the base value is updated to the relevant aggregated data. In the base value management system of the traffic information aggregating apparatus, for example, when an aggregation timer makes a round, the base value is updated to a numerical value obtained from a computation expression using the aggregated data.

According to another export system in the traffic information aggregating apparatus, for example, when a forcible transmission timer makes a round, the accumulated data is exported to the monitor server.

For example, in the case where traffic information relating to certain aggregated data is not received for a specified time, the traffic information aggregating apparatus deletes information relating to the relevant aggregated data from the aggregated data management table.

According to the solving means of this invention, there is provided a traffic information aggregating apparatus in a network system including a network apparatus to export traffic information, a traffic information aggregating apparatus to aggregate the traffic information from the network apparatus to generate aggregated data and to manage the aggregated data, and a monitor server to monitor traffic of the network apparatus based on the aggregated data exported from the traffic information aggregating apparatus, the traffic information aggregating apparatus comprising:

an interface to communicate with the network apparatus and the monitor server;

an aggregated data management table to store aggregated data and accumulated data of the aggregated data correspondingly to an aggregation identifier; and a processing unit, wherein the processing unit receives the traffic information from the network apparatus through the interface, aggregates the traffic information received in an aggregation time specified in advance to generate the aggregated data, stores the aggregated data into the aggregated data management table correspondingly to the aggregation identifier, determines, at an interval of the aggregation time, whether a difference between the stored aggregated data and a base value is within a previously determined range, accumulates, in a case where the difference is within the range, the aggregated data to the corresponding accumulated data in the aggregated data management table and resets the aggregated data, and exports, in a case where the difference exceeds the range, the aggregated data and/or the accumulated data of the aggregated data management table to the monitor server.

According to the invention, since the traffic information aggregating apparatus exports only the aggregated data exceeding the threshold value, the transmission amount of the aggregated data to be exported to the monitor server can be reduced. Besides, according to the invention, when the traffic information aggregating apparatus exports the aggregated data to the monitor server, only the aggregated information with a large variation can be exported.

DETAILED DESCRIPTION OF THE INVENTION

Hereinafter, a data processing apparatus of the invention will be described in more detail with reference to the drawings. Incidentally, in the following, the same reference numeral denotes the same or similar part.

FIG. 1 is a structural view of a traffic monitor system of an embodiment.

The traffic monitor system includes, for example, a monitor server 131, traffic information aggregating apparatuses (collector apparatuses) 121 and 122, and network apparatuses (router apparatuses) 111, 112 and 123. Incidentally, the number of the traffic information aggregating apparatuses 121 and 122 and the number of the network apparatuses 111, 112 and 123 are arbitrary. The traffic information aggregating apparatuses 121 and 122 are connected to the network apparatuses 111, 112 and 123, and further, the monitor server 131 is connected.

The network apparatuses 111, 112 and 113 are packet transfer apparatuses such as, for example, routers, and transfer packets. Traffic information such as NetFlow or sFlow is exported from the network apparatuses 111, 112 and 113 to the traffic information aggregating apparatuses 121 and 122. The traffic information aggregating apparatuses 121 and 122 accumulate the received traffic information as files. Besides, the traffic information aggregating apparatuses 121 and 122 aggregate the received traffic information to generate and manage aggregated data, and export the aggregated data to the monitor server 131 by using a protocol such as NetFlow. Besides, in response to a query request from the monitor server 131, the traffic information aggregating apparatuses 121 and 122 send back traffic information suitable for the query content.

The monitor server 131 monitors the traffic of the network apparatuses 111, 112 and 113 based on the aggregated data exported from the traffic information aggregating apparatuses 121 and 122.

Figure 2:
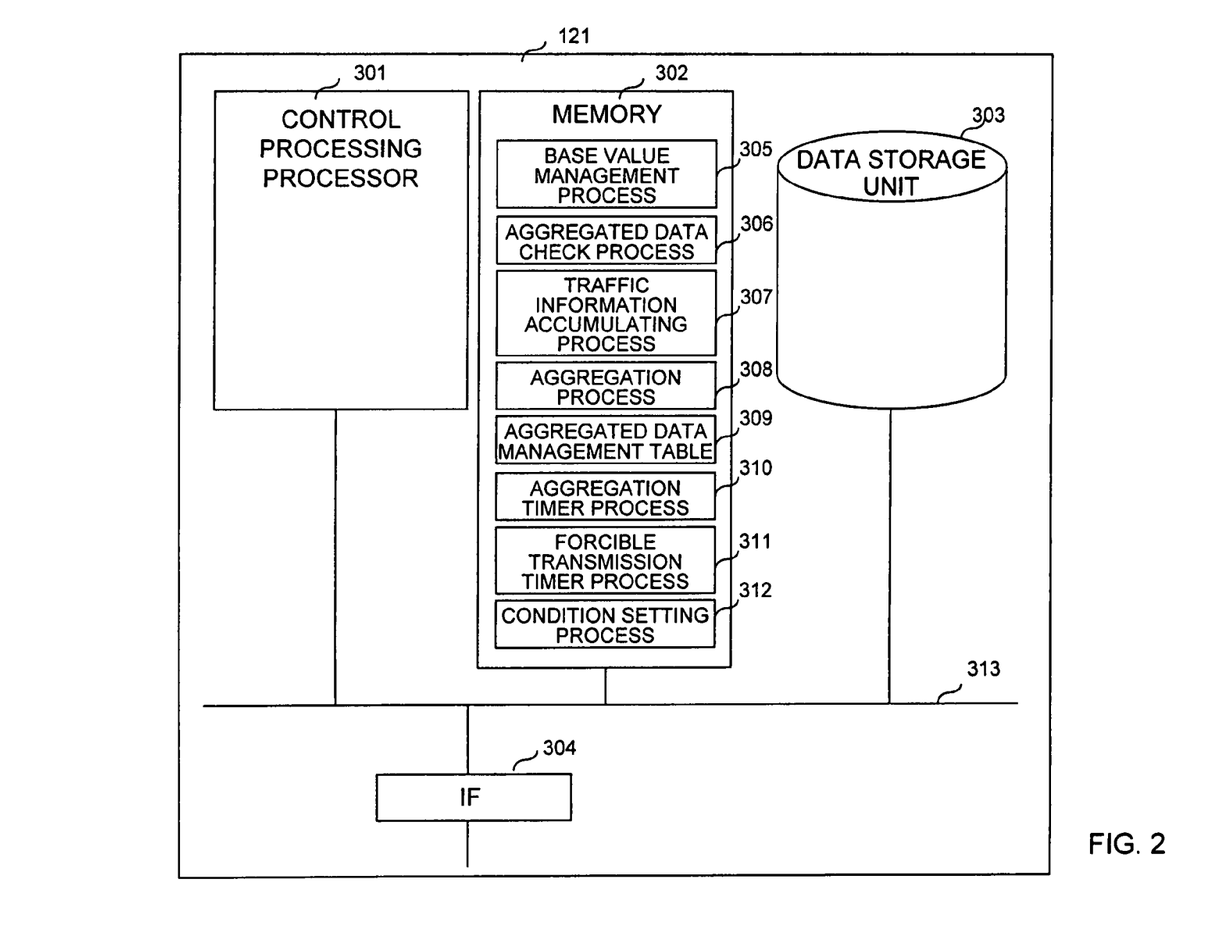
FIG. 2 is a block diagram showing an inner structure of a traffic information aggregating apparatus in a traffic monitor system.

FIG. 2 is a view showing an example of an inner structure of the traffic information aggregating apparatus 121. Incidentally, the traffic information aggregating apparatus 122 of FIG. 1 can also be made to have the same structure.

The traffic information aggregating apparatus 121 includes, as physical structural blocks, a communication interface unit 304, a control processing processor (processing unit) 301, a data communication bus 313, a memory unit 302, and a data storage device 303. The memory 302 includes an aggregated data management table 309. Further, the memory 302 includes various programs such as, for example, a base value management process 305, an aggregated data check process 306, a traffic information accumulating process 307, an aggregation process 308, an aggregation timer process 310, a forcible transmission timer process 311, and a condition setting process 312. The respective processes are read in, for example, the processor 301 and are executed. For example, a base value management process, a monitor parameter check process, a traffic information reception process, an aggregation process and the like are executed on the memory 302 by the respective programs. Incidentally, in the drawing, although the aggregation timer process 310 and the forcible transmission timer process 311 are described on the memory, an aggregation timer (first timer) and a forcible transmission timer (second timer) may be appropriately provided.

The communication interface unit 304 is an interface for communication with, for example, the network apparatus 111 and the monitor server 131.

Figure 5:
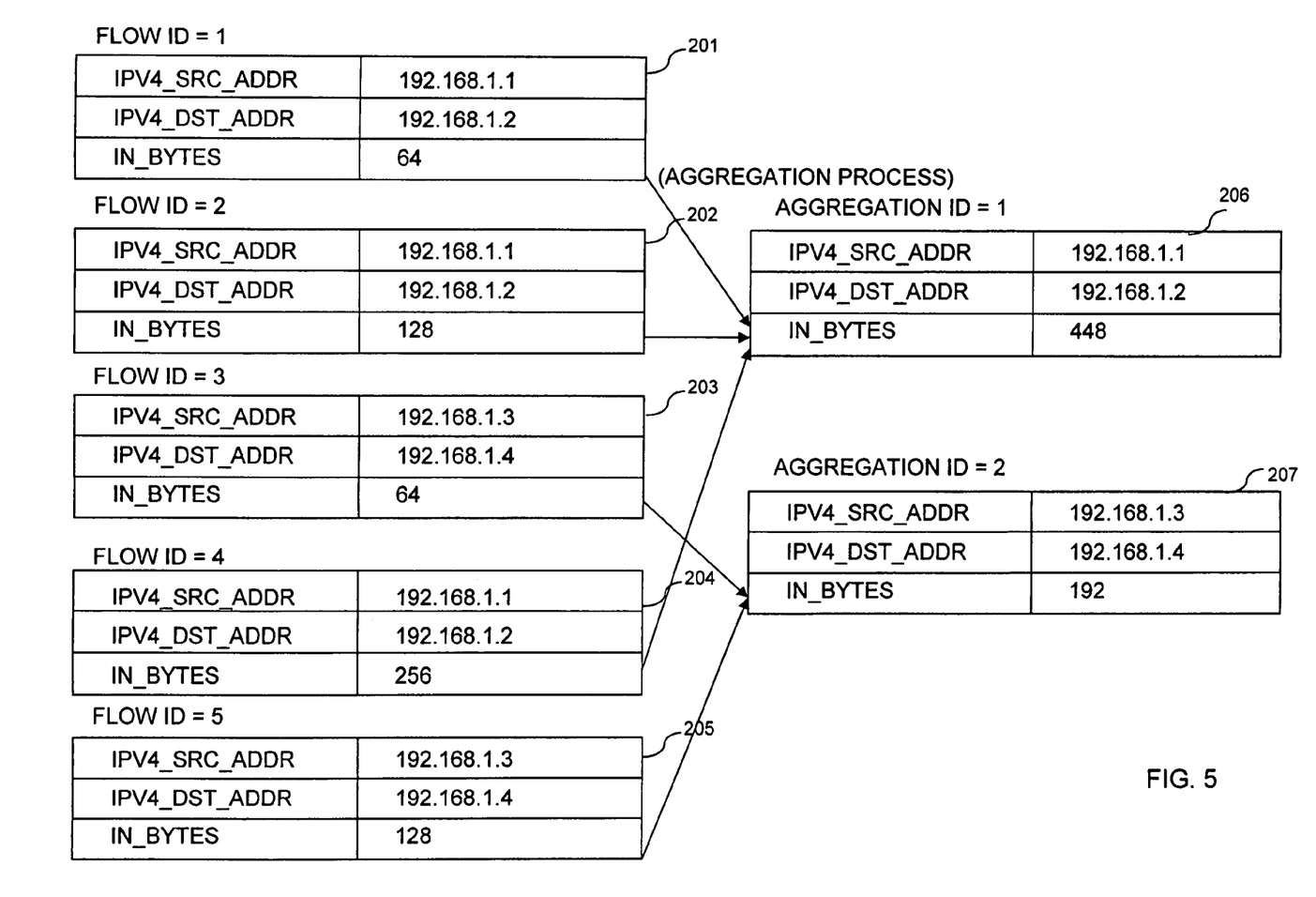
FIG. 5 is a view showing an aggregation system in the traffic information aggregating apparatus.

FIG. 5 shows an example of an aggregation system performed in the aggregation process.

An aggregation processing unit 308 receives traffic information 201, 202, 203, 204 and 205 from the network apparatus 111. For example, a flow identifier (flow ID), a destination IP address (IPV4_DST_ADDR), a source IP address (IPV4_SRC_ADDR), and a byte number of a flow are included. The aggregation processing unit 308 aggregates traffic information having the same source IP address (IPV4_SRC_ADDR) and the same destination IP address (IPV4_DST_ADDR), and converts it into aggregated data 206, 207. At the time of aggregation, what is obtained by adding the byte numbers (1N_BYTES) of the respective flows is described as the byte number of the aggregated data. The flow identifier (RECORD_ID=1 to 5) is given to the traffic information, and an aggregation identifier (AGGR_1D=1 to 2) is given to the aggregated data according to the destination and the source. In this embodiment, although the description will be made on the case where the traffic information is received from one network apparatus, it may be received from plural network apparatuses. In this case, management can be made such that, even when several pieces of traffic information have the same destination address and the same source address, they are separately aggregated, and different aggregation identifiers are given for the respective network apparatuses.

Figure 6:
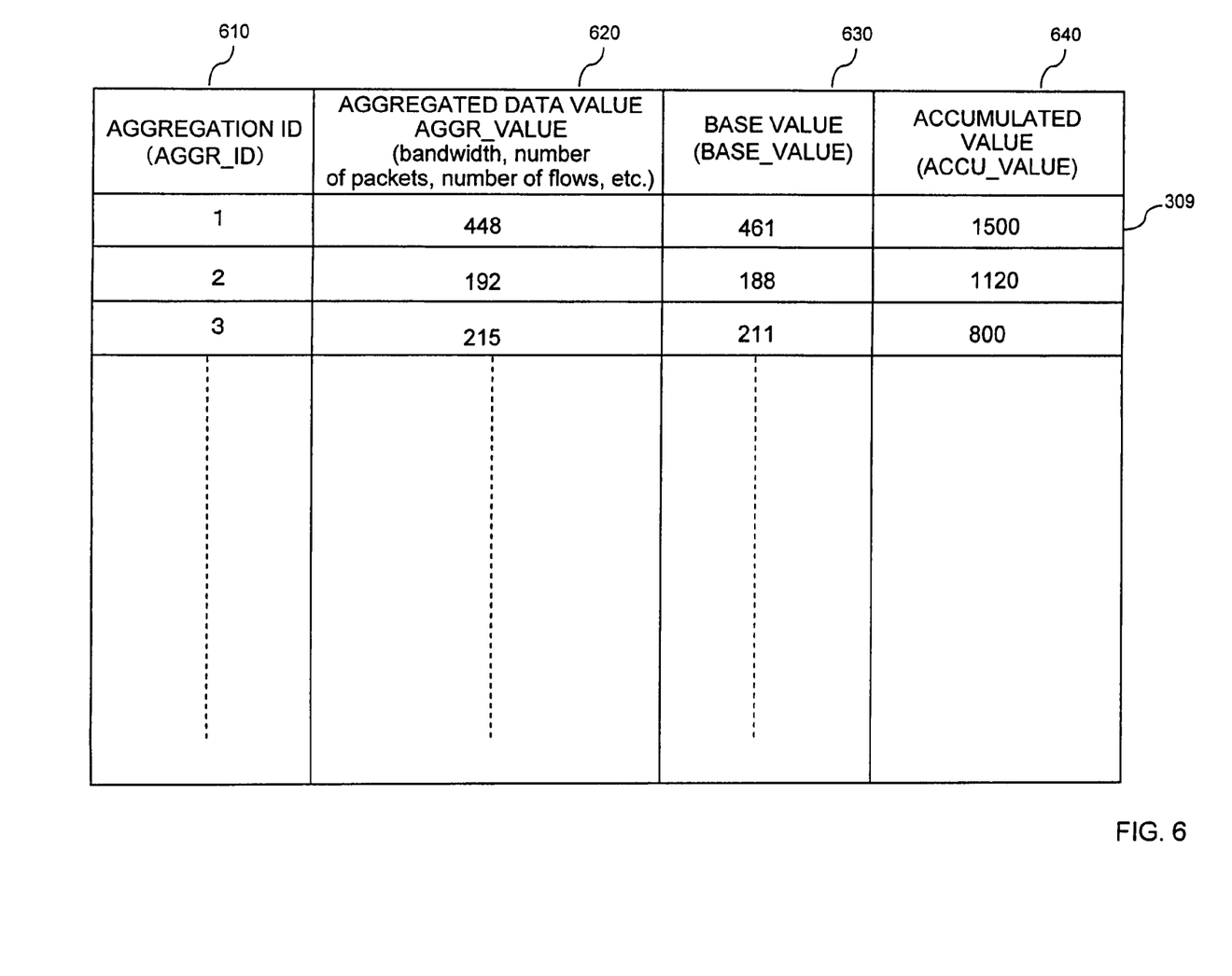
FIG. 6 is a view showing a structure of an aggregated data management table (traffic information table) in the traffic information aggregating apparatus.

The aggregation processing unit 308 stores aggregated data (for example, 448) into the aggregated data management table 309 correspondingly to an aggregation identifier (for example, 1).

FIG. 6 shows an example of a structure of the aggregated data management table 309.

The aggregated data management table (aggregated information table) 309 includes, for example, an aggregation identifier (AGGR_ID) 610, an aggregated data value (AGGR_VALUE) 620, a base value (BASE_VALUE) 630, and an accumulated value (ACCU_VALUE) 640. The aggregated data value (CURRENT_VALUE) 620 indicates a data value (for example, bandwidth, number of packets, number of flows, etc.) being aggregated. The base value (BASE_VALUE) 630 indicates a numerical value as a base when the variation of the aggregated data value is calculated. The accumulated value (ACCU_VALUE) 640 indicates an accumulated value of aggregated data aggregated after the last export of aggregated data.

Figure 3:
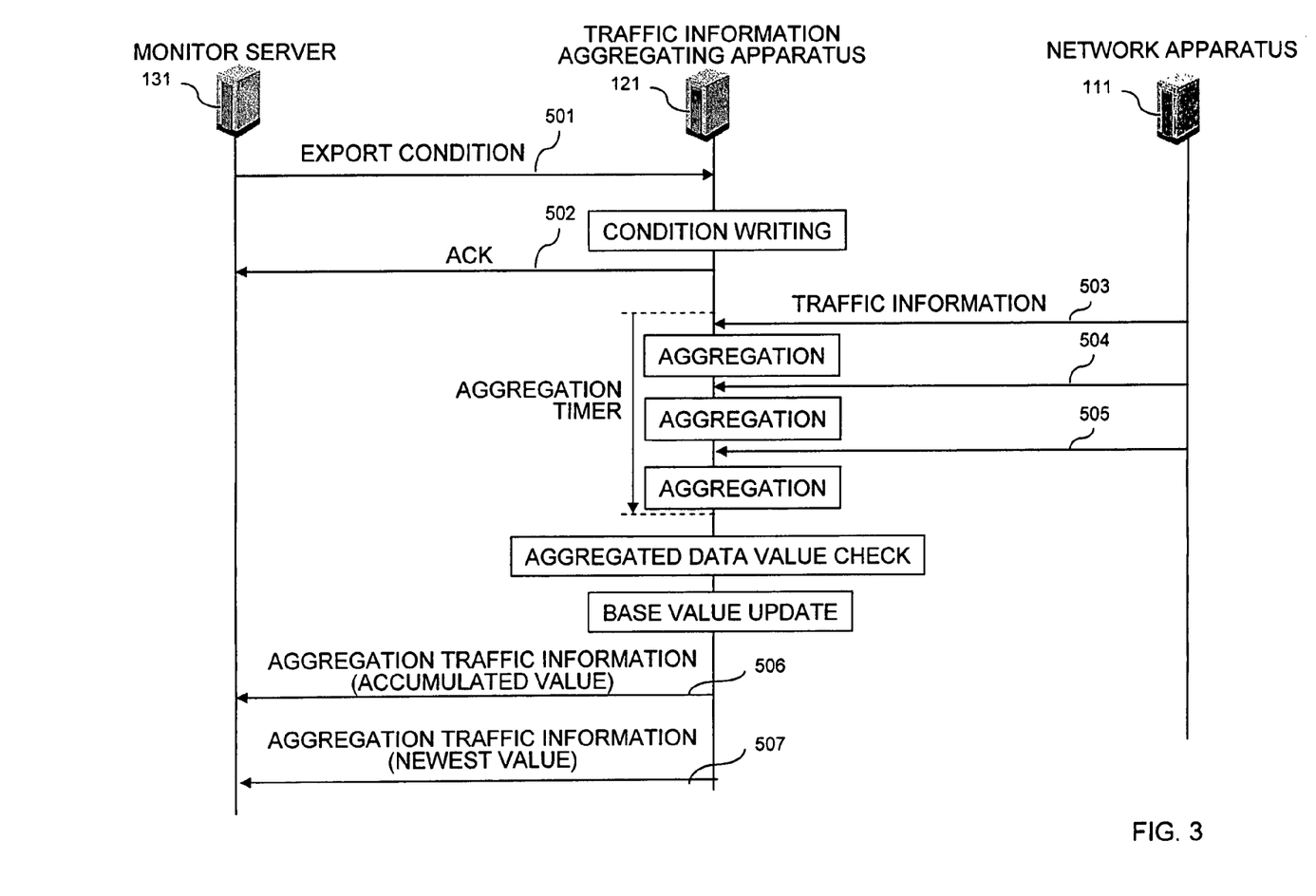
FIG. 3 is a view (1) showing a sequence in the traffic monitor system.

FIG. 3 is a communication sequence view among the network apparatus 111, the traffic information aggregating apparatus 121 and the monitor server 131.

At step 501, the monitor server 131 exports an export condition to the traffic information aggregating apparatus 121. The export condition includes, for example, a margin value as a difference between the base value and a threshold value, a period (forcible transmission time) of a forcible transmission timer, and the like. Besides, the export condition may include, for example, a period (aggregation time) of an aggregation timer, and the kind of aggregated data. The traffic information aggregating apparatus 121 stores the received export condition in the aggregated data check process 306. Besides, the period of a correction transmission timer, and the period of an aggregation timer are set in accordance with the export condition. The traffic information aggregating apparatus 121 sends back ACK at step 502.

At steps 503, 504 and 505, when the traffic information is exported from the network apparatus 113, the traffic information aggregating apparatus 121 performs the aggregation of the traffic information by the aggregation process 308, and records the aggregated data in the aggregated data management table 309. Incidentally, the traffic information from the network apparatus is received at a suitable timing. In the aggregation timer process 310, when the aggregation timer becomes full (aggregation time), the aggregated data check process 306 confirms whether the aggregated data exceeds the threshold value. In the case where it exceeds the threshold value, the traffic information aggregating apparatus 121 exports the accumulated value to the monitor server 131 at step 506. Besides, the base management process 305 rewrites the base value to the aggregated data. At step 507, the traffic information aggregating apparatus 121 exports the aggregated data to the monitor server 131. Incidentally, the aggregated data and the accumulated value may be exported in one process instead of steps 506 and 507.

Figure 4:
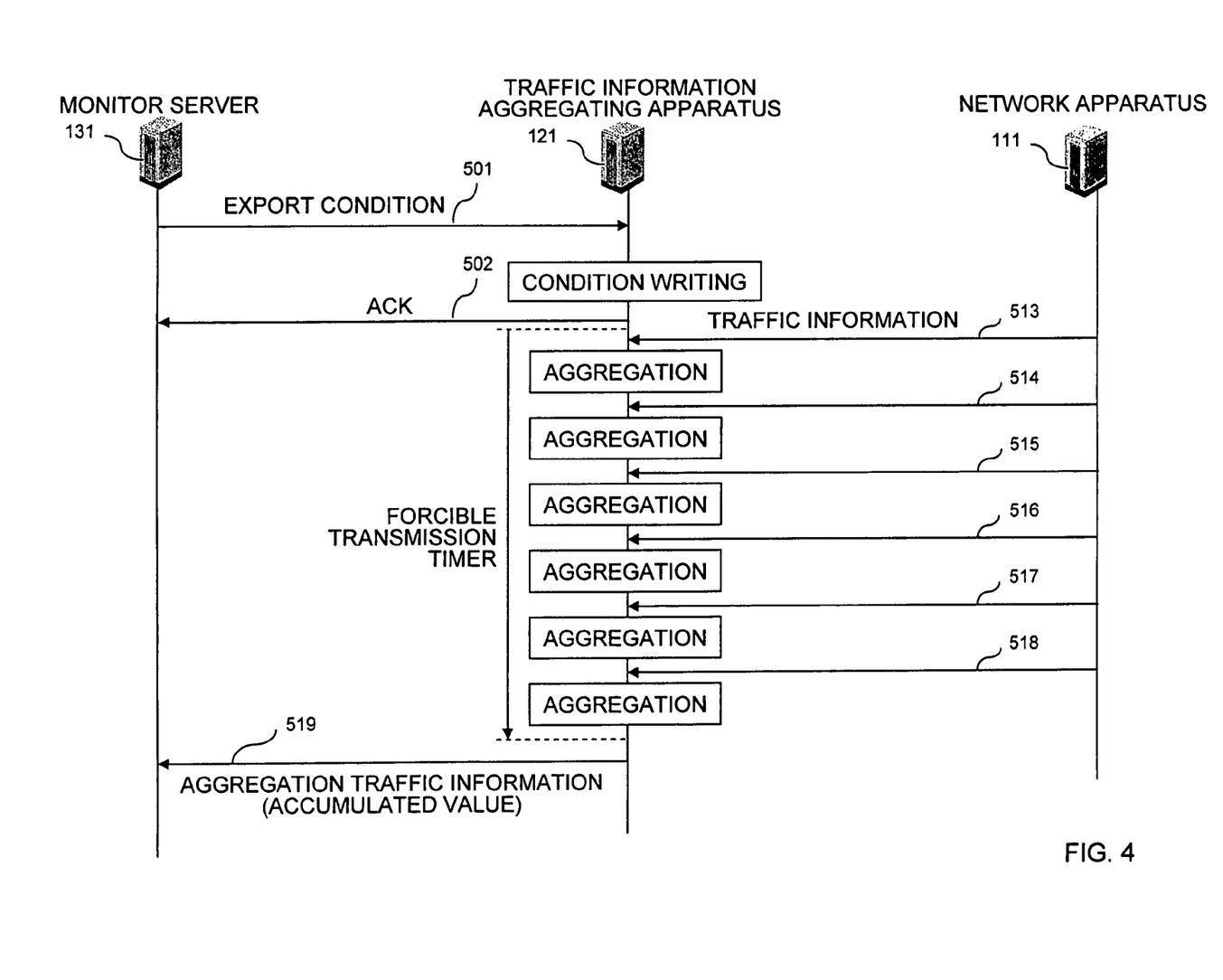
FIG. 4 is a view (2) showing a sequence in the traffic monitor system.

FIG. 4 is a sequence diagram among the network apparatus 111, the traffic information aggregating apparatus 121 and the monitor server 131 at the time of forcible transmission.

Similarly to FIG. 3, at step 501, the monitor server 131 exports an export condition to the traffic information aggregating apparatus 121. The traffic information aggregating apparatus 121 stores the received export condition in the aggregated data check process 306, and sends back ACK at step 502.

At steps 513, 514, 515, 516, 517 and 518, when traffic information is exported from the network apparatus 113, the traffic information aggregating apparatus 121 performs the aggregation of the traffic information by the aggregation process 308, and records the aggregated data in the aggregated data management table 309. Besides, when the aggregation timer becomes full, the same process as that of FIG. 3 is performed. Here, it is assumed that the aggregated data does not exceed the threshold value. In the forcible timer process 311, when the forcible transmission timer becomes full (forcible transmission time), the aggregated data check process 306 exports the accumulated value 640 of the aggregated data management table 309 to the monitor server 131.

Figure 7:
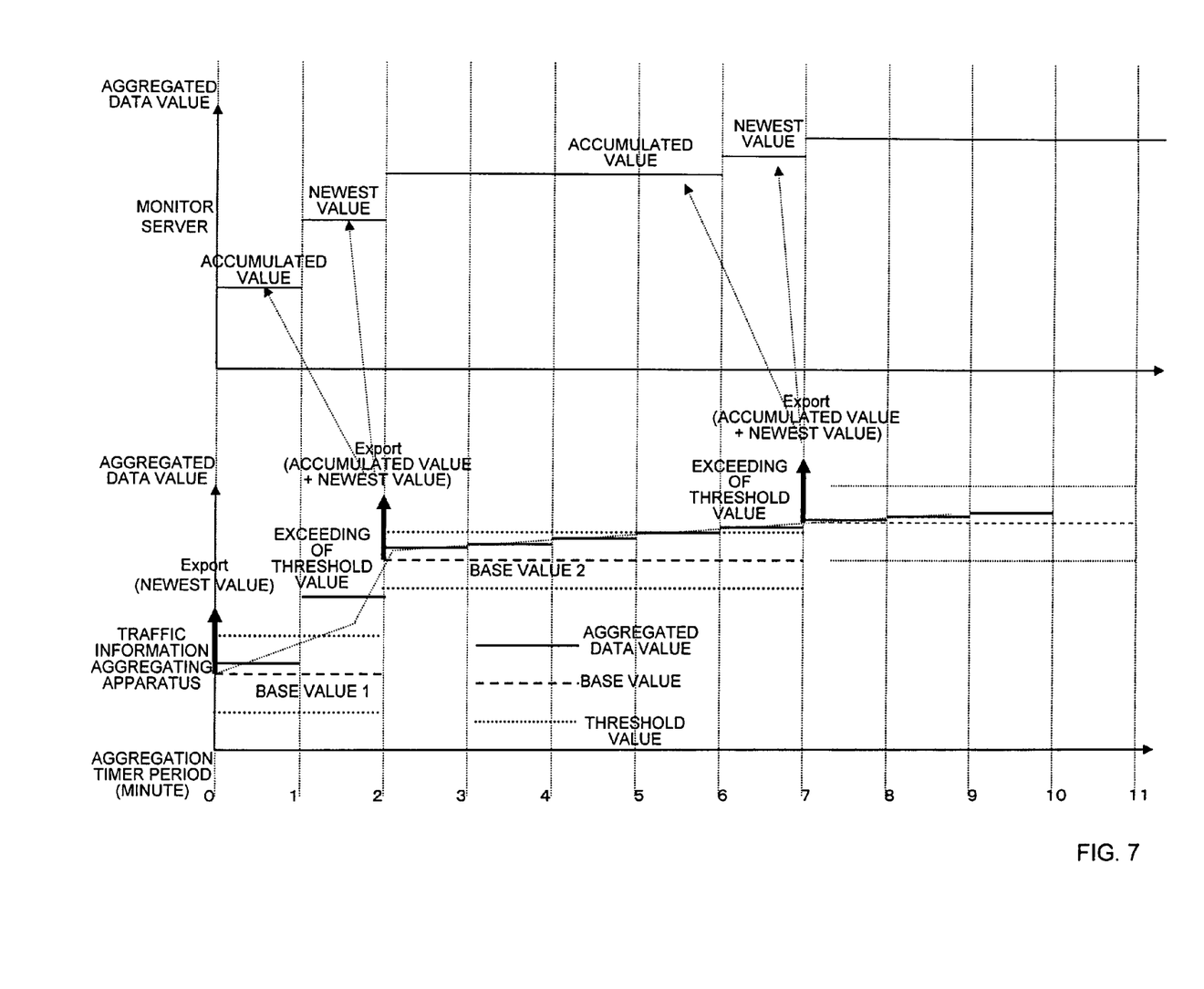
FIG. 7 is a view (1) showing timing of export in the traffic monitor system.

FIG. 7 shows timing when the traffic information aggregating apparatus 121 exports data to the monitor server 131.

The horizontal axis indicates the period (minute) of the aggregation timer, and the vertical axis indicates the aggregated data value. The lower graph shows the aggregated data value of the traffic information aggregating apparatus 121, while the upper graph shows the aggregated data value received by the monitor server 131. Besides, a horizontal solid line in the graph indicates the aggregated data value, a broken line indicates the base value, and a dotted line indicates the threshold value. Incidentally, the threshold value can include an upper limit threshold value as a value obtained by adding a margin value to the base value, and a lower limit threshold value as a value obtained by subtracting the margin value from the base value. The traffic information aggregating apparatus 121 confirms the aggregated data value at every period of the aggregation timer, and determines whether a difference from the base value exceeds a previously determined range. In the case where the difference exceeds the range (that is, the aggregated data value exceeds the upper limit threshold value or the lower limit threshold value), the traffic information aggregating apparatus 121 rewrites the base value 630 to the aggregated data 620, and exports the accumulated value 640 of the aggregated data which have been aggregated until the time point and the newest aggregated data 620 to the monitor server 131. In the case of FIG. 7, since the aggregated data exceeds the threshold value at period 2 and period 7, the accumulated value and the newest value of the aggregated data are exported at the respective timings. Incidentally, as described after, the base value may be obtained based on the plural past aggregated data, and the example of the drawing is the example in which the base value is determined as stated above.

The reason why the accumulated value and the newest value are separately exported is as follows. In order that the monitor server 131 grasps the information of the past aggregated data which has not been exported by the traffic information aggregating apparatus 121, it is exported as the accumulated value. Besides, in order that the monitor server 131 grasps the aggregated data value for one period when it exceeds the threshold value, the newest value is exported separately from the accumulated value.

For example, the traffic information aggregating apparatus 121 exports the aggregated data at period 0, and next, at period 2 when the aggregated data exceeds the threshold value (the difference exceeds the range), the aggregated data at period 2 and the accumulated value up to period 1 are exported. In the monitor server, the aggregated data at period 2 is stored, and with respect to period 1, based on the accumulated value, for example, the time average of the accumulated value is stored.

Next, at period 7 when the aggregated data exceeds the threshold value (the difference exceeds the range), the aggregated data at period 7 and the accumulated value in period 2 to period 6 are exported. In the monitor server, the aggregated data at period 7 is stored, and with respect to periods 2 to 6, for example, the time average of the accumulated value is stored.

Figure 11:
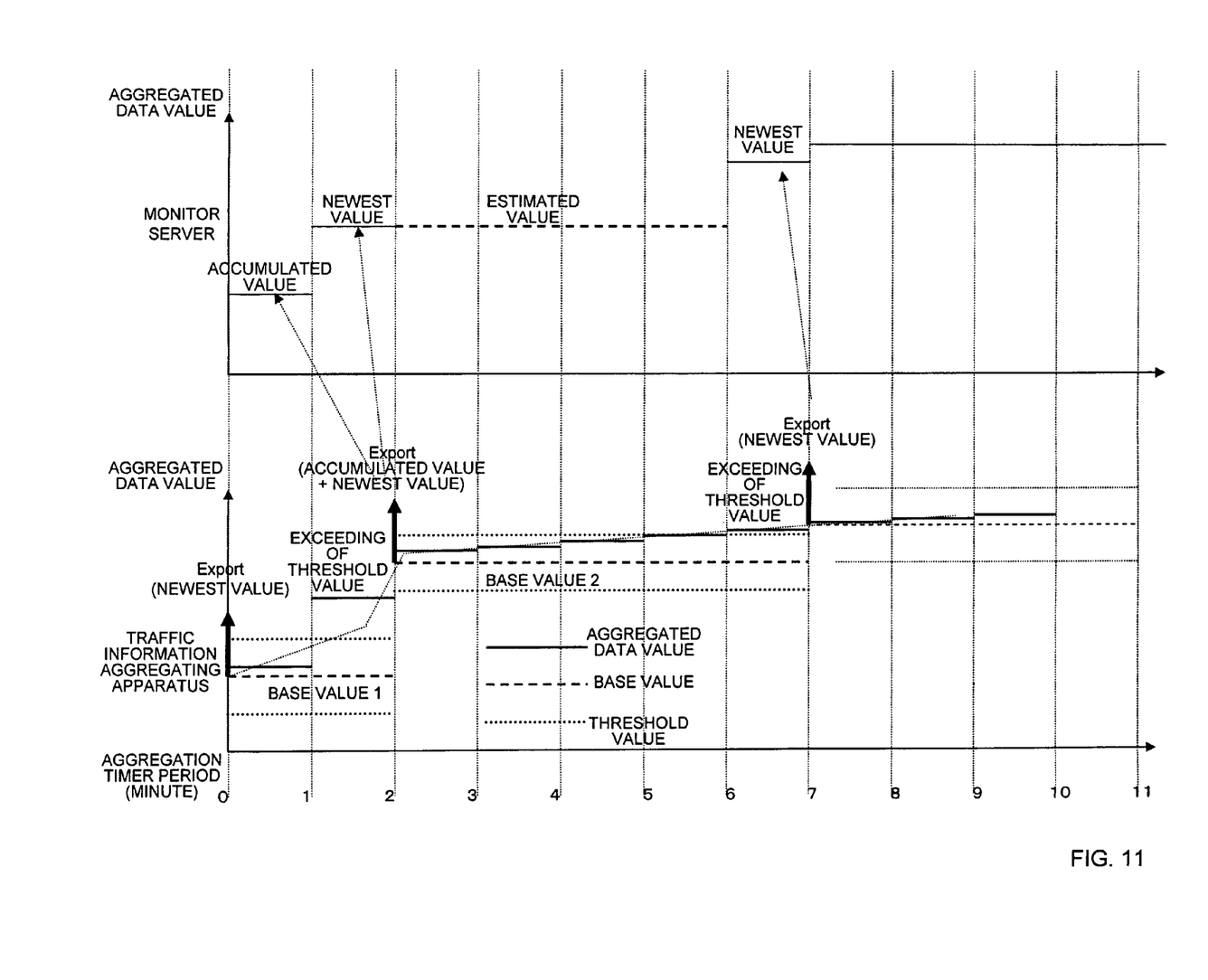
FIG. 11 is a view (3) showing timing of export in the traffic monitor system.

FIG. 11 shows another example in which the traffic information aggregating apparatus 121 performs export to the monitor server 131.

In the example of FIG. 11, as compared with the example of FIG. 7, an accumulated value is not exported at period 7, but newest aggregated data is exported. In this case, based on aggregated data received at the last time (aggregated data received at period 2 in the example of the drawing), the monitor server 131 may obtain an estimated value up to period 6 and store it. For example, the aggregated data received at the last time (at period 2 in the example of the drawing) may be used as it is, or the estimated value may be obtained based on the last aggregated data and the aggregated data received at period 7. Incidentally, also at period 2, only the newest value may be exported.

Figure 8:
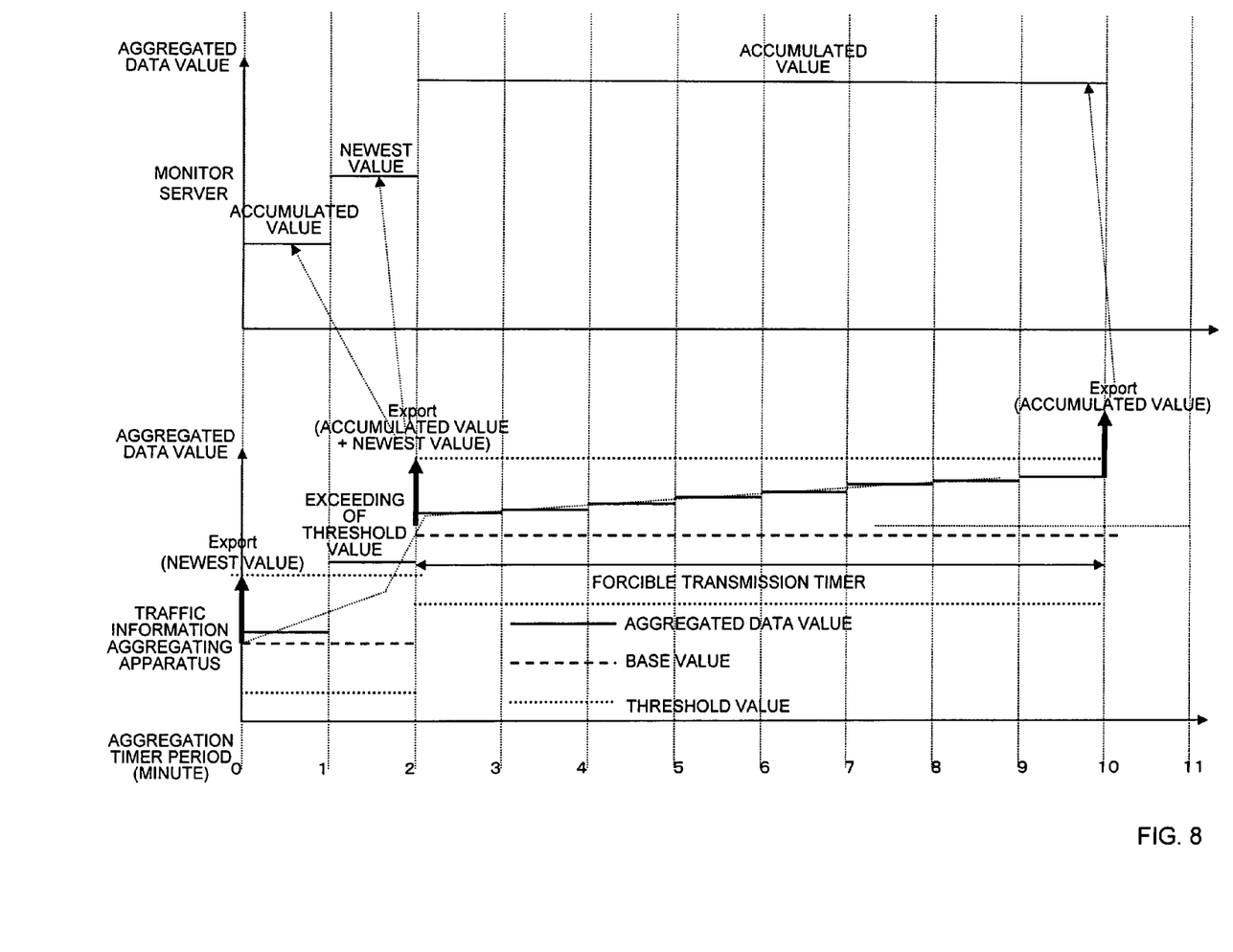
FIG. 8 is a view (2) showing timing of export in the traffic monitor system.

FIG. 8 shows an example of a forcible transmission process in the case where the traffic information aggregating apparatus 121 does not export data for a specified time.

Since the aggregated data value exceeds the threshold value at period 2, the traffic information aggregating apparatus 121 performs the export to the monitor server 131. Thereafter, since the exceeding of the threshold value does not occur until period 10, the forcible transmission timer (in this example, the forcible transmission time is set to 8 minutes) becomes full, and accordingly, the accumulated data is exported. Incidentally, as the accumulated value here, for example, the accumulated value up to period 10 is exported.

Figure 9:
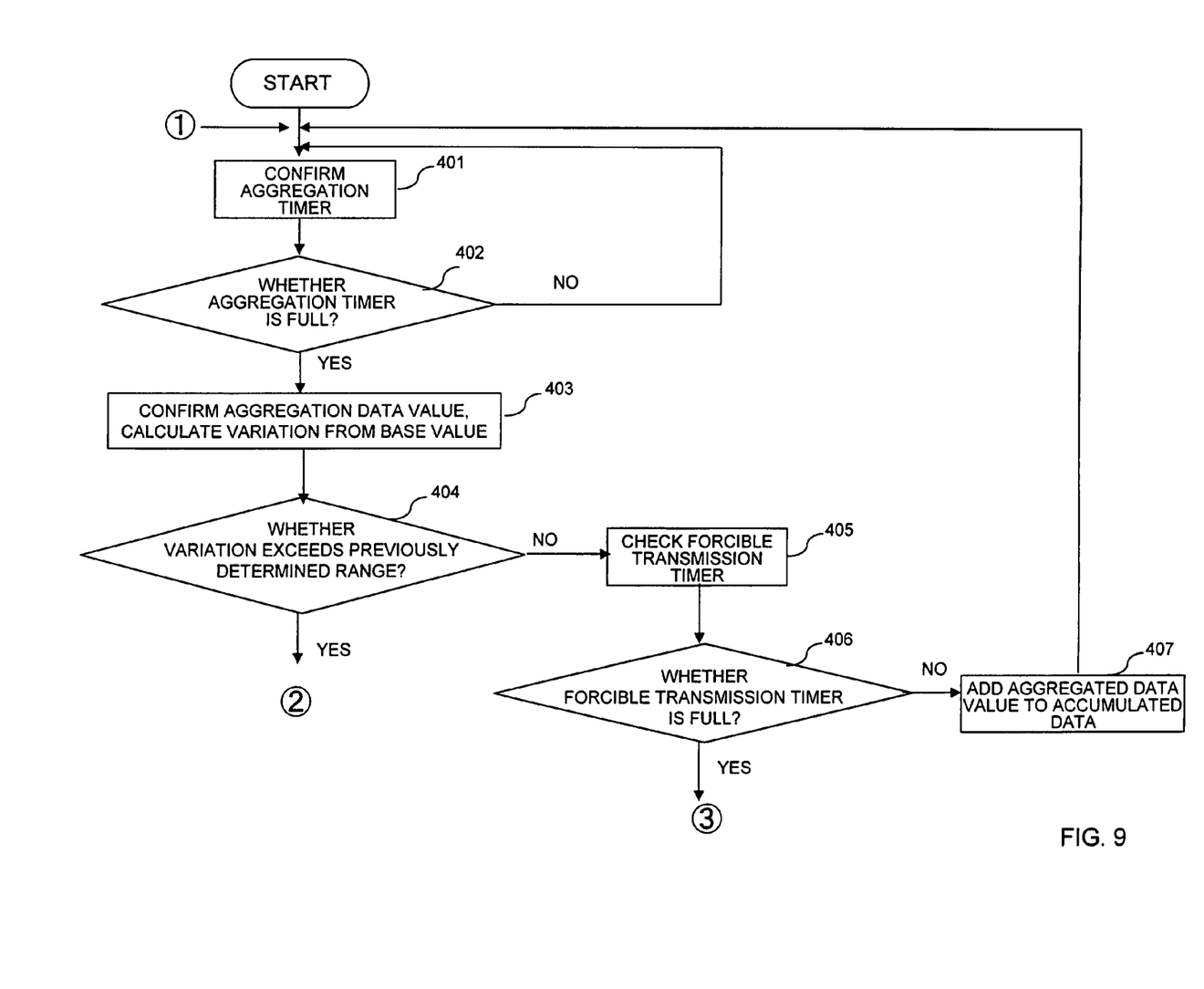
FIG. 9 is a view showing a process flow (1) of the traffic information aggregating apparatus in the traffic monitor system.
Figure 10:
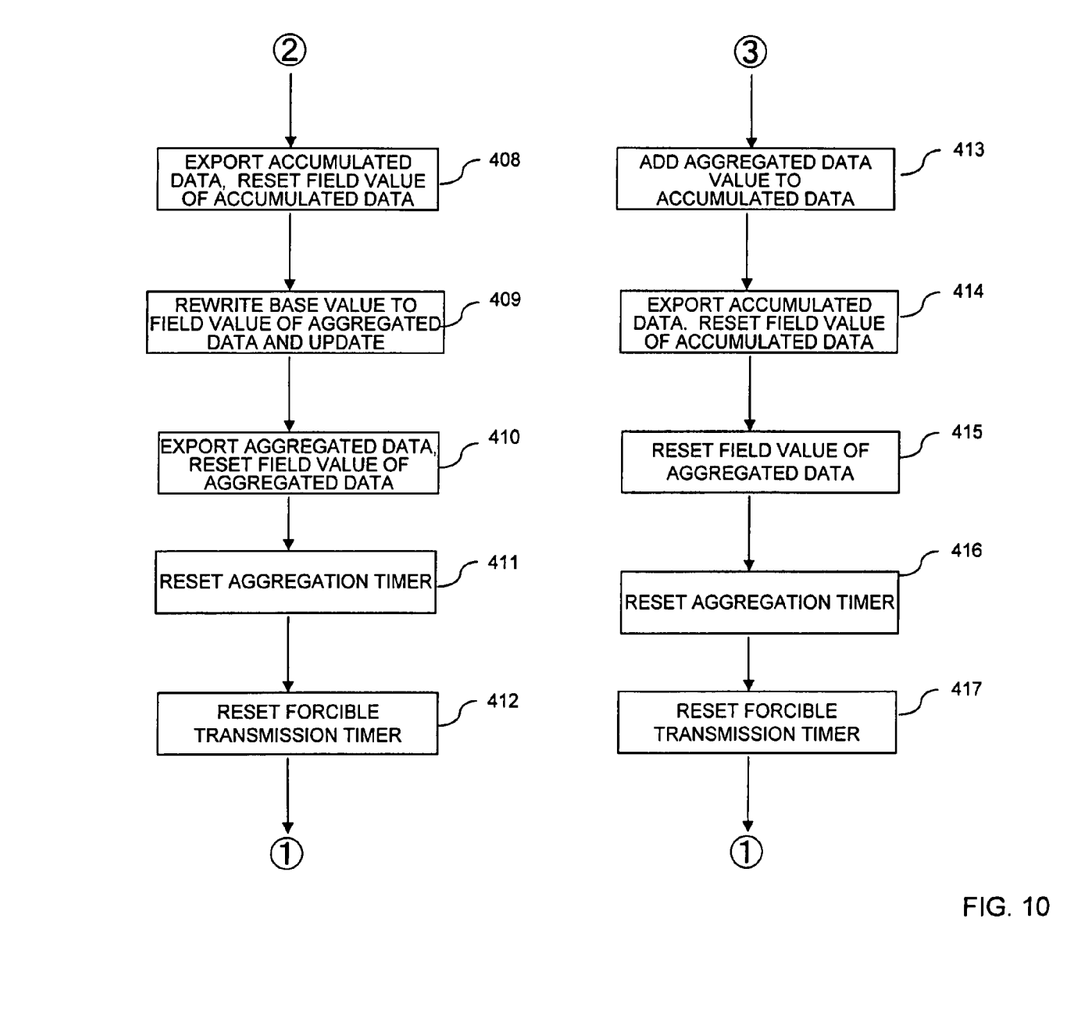
FIG. 10 is a view showing a process flow (2) of the traffic information aggregating apparatus in the traffic monitor system.

FIG. 9 and FIG. 10 show a process flow of the traffic information aggregating apparatus 121.

Separately from the following process, the traffic information aggregating apparatus 121 (for example, the processing unit 301, the same applies below) receives the traffic information at a suitable timing from the network apparatus 111 or the like, aggregates the received traffic information, and stores the aggregated data in the aggregated data management table 309.

The traffic information aggregating apparatus 121 confirms the aggregation timer at step 401, and determines at step 402 whether the aggregation timer becomes full (aggregation time). In the case where the aggregation timer becomes full, advance is made to step 403, while in the case where it is not full, return is made to step 401. At step 403, the traffic information aggregating apparatus 121 confirms the aggregated data value (AGGR_VALUE) 620 of the aggregated data management table 309, and calculates, as a variation, a difference from the base value (BASE_VALUE) 630.

The traffic information aggregating apparatus 121 determines at step 404 whether the calculated variation exceeds a previously determined range. Incidentally, this range can be determined from the export condition from the monitor server 131. In the case of exceeding the range, advance is made to step 408, while in the case of not exceeding the range, advance is made to step 405.

Advance is made to FIG. 10, and the traffic information aggregating apparatus 121 exports the accumulated value (ACCU_VALUE) 640 at step 408, and then, resets the accumulated value. At step 409, the traffic information aggregating apparatus 121 rewrites the base value 630 to the aggregated data 620 and updates it. The traffic information aggregating apparatus 121 exports the aggregated data 620 at step 410, and then, resets the aggregated data. The traffic information aggregating apparatus 121 resets the aggregation timer at step 411, and resets the forcible transmission timer at step 412.

Return is made to FIG. 9, and at step 405, the traffic information aggregating apparatus 121 checks the forcible transmission timer, and at step 406, it is determined whether the forcible transmission timer becomes full (forcible transmission time). In the case where the timer becomes full, the traffic information aggregating apparatus 121 proceeds to step 413, while in the case where it is not full, advance is made to step 407.

At step 407, the traffic information aggregating apparatus 121 adds and accumulates the aggregated data value 620 to the accumulated data value 640. Besides, the aggregated data is reset and return is made to step 401.

Advance is made to FIG. 10, and at step 413, the traffic information aggregating apparatus 121 adds the aggregated data value 620 to the accumulated data value 640. At step 414, the traffic information aggregating apparatus 121 exports the accumulated data value 640, and resets the accumulated data value. Besides, the traffic information aggregating apparatus 121 resets the aggregated data value 620 at step 415. The traffic information aggregating apparatus 121 resets the aggregation timer at step 416, and resets the forcible transmission timer at step 417.

The traffic information aggregating apparatus 121 returns to step 401, and repeats the process subsequent to step 401.

As an example other than the foregoing management system of the base value (the system in which the aggregated data value at the time of the last export is made the base value), there is a system in which the base value is calculated by a function or a computation expression using aggregated data for each aggregation timer. As the function used, there is, for example, a movement average method or a Holts-Winters method.

Besides, the traffic information aggregating apparatus 121 stores the past aggregated data, and may obtain the base value based on the plural stored past aggregated data.

As an example other than the system in which the accumulated value and the aggregated data are exported, there is a system in which only the aggregated data is exported. In this case, it is necessary that information of aggregated data in a period when the aggregated data is not exported is complemented by the monitor server.

Besides, as another example of the management system of the aggregated data management table 309, there is a system in which in a certain aggregation identifier (AGGR_ID), in the case where the traffic information aggregating apparatus 121 does not receive the traffic data to be aggregated by the aggregation identifier from the network apparatuses 111, 112, 113 for a specified time, it is determined that the aggregated data is unnecessary, and the relevant aggregation identifier of the aggregated data management table 309 and values related thereto (aggregated data value, base value, accumulated value) are deleted.

Besides, in the embodiment, although the upper limit threshold value and the lower limit threshold value are included, the upper limit threshold value and the lower limit threshold value may be the same values or may be different values. Besides, only one of the upper limit threshold value and the lower limit may be included.

The present invention can be used for, for example, a traffic monitor system in which traffic information is accumulated and aggregated.

What is claimed is:

1. A traffic information aggregating apparatus in a network system including a network apparatus to export traffic information, the traffic information aggregating apparatus to aggregate the traffic information from the network apparatus to generate aggregated data and to manage the aggregated data, and a monitor server to monitor traffic of the network apparatus based on the aggregated data exported from the traffic information aggregating apparatus, the traffic information aggregating apparatus comprising:

an interface to communicate with the network apparatus and the monitor server;

an aggregated data management table to store aggregated data and accumulated data of the aggregated data correspondingly to an aggregation identifier; and a processing unit, wherein the processing unit receives the traffic information from the network apparatus through the interface, aggregates the traffic information received in an aggregation time specified in advance to generate the aggregated data, stores the aggregated data into the aggregated data management table correspondingly to the aggregation identifier, determines, at an interval of the aggregation time, whether a difference between the stored aggregated data and a base value that is based on previously accumulated exported data is within or exceeds a previously determined range for comparing to the difference, accumulates, in a case where the difference is within the range, the aggregated data to the corresponding accumulated data in the aggregated data management table and resets the aggregated data, and exports, in a case where the difference exceeds the range, at least one of the aggregated data and the accumulated data of the aggregated data management table to the monitor server.

2. The traffic information aggregating apparatus according to claim 1, further comprising a first timer to measure the aggregation time.

3. The traffic information aggregating apparatus according to claim 2, wherein the processing unit receives information of the previously determined range and aggregation time information from the monitor server through the interface, and stores the received information of the range, and sets the first timer based on the received aggregation time information.

4. The traffic information aggregating apparatus according to claim 1, wherein the processing unit aggregates the traffic information for each destination address and each source address, and stores the aggregated data into the aggregated data management table correspondingly to an aggregation identifier of the destination address and the source address.

5. The traffic information aggregating apparatus according to claim 1, wherein the processing unit exports the accumulated data and the aggregated data to the monitor server.

6. The traffic information aggregating apparatus according to claim 5, wherein in the network system in which the monitor server monitors the aggregated data at the interval of the aggregation time, the processing unit exports the aggregated data and the accumulated data to the monitor server in a case where the difference between the aggregated data and the base value exceeds the previously determined range, and in the monitor server, the aggregated data for each aggregation time from reception of the last aggregated data till now is complemented based on the accumulated data, and the aggregated data is monitored at the interval of the aggregation time.

7. The traffic information aggregating apparatus according to claim 1, wherein the processing unit exports the aggregated data to the monitor server.

8. The traffic information aggregating apparatus according to claim 7, wherein in the network system in which the monitor server monitors the aggregated data at the interval of the aggregation time, the processing unit exports the aggregated data to the monitor server in a case where the difference between the aggregated data and the base value exceeds the previously determined range, and in the monitor server, aggregated data for each aggregation time from reception of the last aggregated data till now is complemented based on the last received aggregated data, and the aggregated data is monitored at the interval of the aggregation time.

9. The traffic information aggregating apparatus according to claim 1, wherein the aggregated data management table further stores the base value of aggregated data for each aggregation identifier.

10. The traffic information aggregating apparatus according to claim 1, wherein in the case where the difference between the aggregated data and the base value exceeds the previously determined range, the base value is updated to a value of the aggregated data.

11. The traffic information aggregating apparatus according to claim 1, further comprising a second timer to measure a time interval from resetting to a previously determined forcible transmission time, wherein in the case where the difference between the aggregated data and the base value exceeds the previously determined range, the second timer is reset, and when the second time becomes the forcible transmission time since the difference between the aggregated data and the base value does not exceed the previously determined range, the accumulated data of the aggregated data management table is exported to the monitor server.

12. The traffic information aggregating apparatus according to claim 1, wherein in a case where traffic information relating to certain aggregated data is not received for a specified time, at least one of the relevant aggregated data and the accumulated data is deleted from the aggregated data management table.

* * * * *